United States Patent [19]

Shimizu

[11] Patent Number: 5,293,378
[45] Date of Patent: Mar. 8, 1994

[54] PARALLEL MULTI-LINE PACKET TRANSMISSION SYSTEM

[75] Inventor: Hiroshi Shimizu, Tokyo, Japan

[73] Assignee: NEC Corporation, Tokyo, Japan

[21] Appl. No.: 944,295

[22] Filed: Sep. 14, 1992

[30] Foreign Application Priority Data

Sep. 13, 1991 [JP] Japan .................... 3-235067

[51] Int. Cl.$^5$ ............................ H04J 3/24
[52] U.S. Cl. ..................... 370/94.1; 370/110.1; 370/112; 375/38
[58] Field of Search ............ 370/60, 60.1, 94.1, 370/94.2, 94.3, 82, 84, 112, 43, 100.1, 105.1, 105.4, 105.5, 54, 110.1; 375/106, 114, 38; 455/59

[56] References Cited

U.S. PATENT DOCUMENTS

| | | | |
|---|---|---|---|
| 4,577,312 | 3/1986 | Nash | 370/84 |
| 4,703,475 | 10/1987 | Dretzka et al. | 370/54 |
| 4,885,738 | 12/1989 | Bowers et al. | 370/84 |
| 4,999,835 | 3/1991 | Lagoutte | 370/60 |
| 5,065,396 | 11/1991 | Castellano et al. | 370/112 |
| 5,202,886 | 4/1993 | Rossi et al. | 370/84 |

OTHER PUBLICATIONS

Draft Supplement to IEEE Std. 802.3, P802.31/D10, Type 10BASE-T, Feb. 15, 1990, pp. 1-29.

Primary Examiner—Douglas W. Olms
Assistant Examiner—Hassan Kizou
Attorney, Agent, or Firm—Sughrue, Mion, Zinn, Macpeak & Seas

[57] ABSTRACT

A packet transmission system wherein a packet can be transmitted at a high rate over a long transmission distance using a transmission medium which is economical and easy to handle. Under the control of a transmission controller, a separating circuit divides a packet of a packet signal into six payloads to make six transmission frames and adds a start delimiter SD and an end delimiter ED to the first and last transmission frames, and four transmitters send out the six transmission frames in accordance with sequence numbers at a rate at which the signal can be transmitted by way of time division transmission lines. Under the control of a reception controller, four receivers receive the transmission frames, and a restoring circuit assembles the transmission frames back into the original packet signal in accordance with the sequence numbers and the delimiter information.

9 Claims, 4 Drawing Sheets

FIG.2
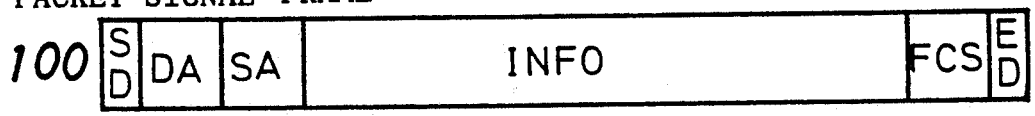
PACKET SIGNAL FRAME
100 | SD | DA | SA | INFO | FCS | ED |
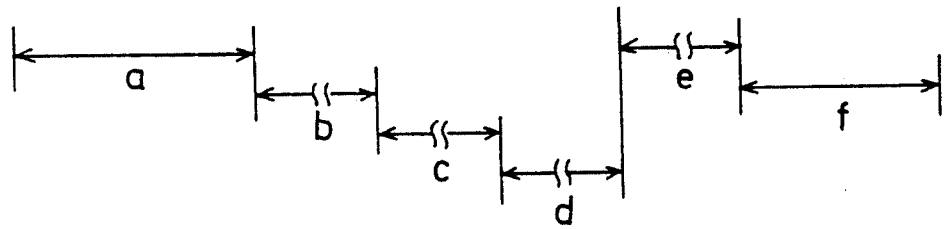
TRANSMISSION FRAME
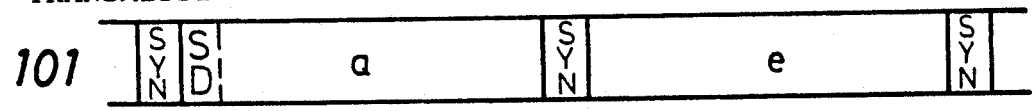
101 | SYN | SD | a | SYN | e | SYN |
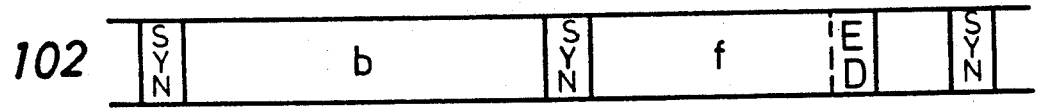
102 | SYN | b | SYN | f | ED | SYN |
103 | SYN | c | SYN | | SYN |
104 | SYN | d | SYN | | SYN |
PAYLOAD

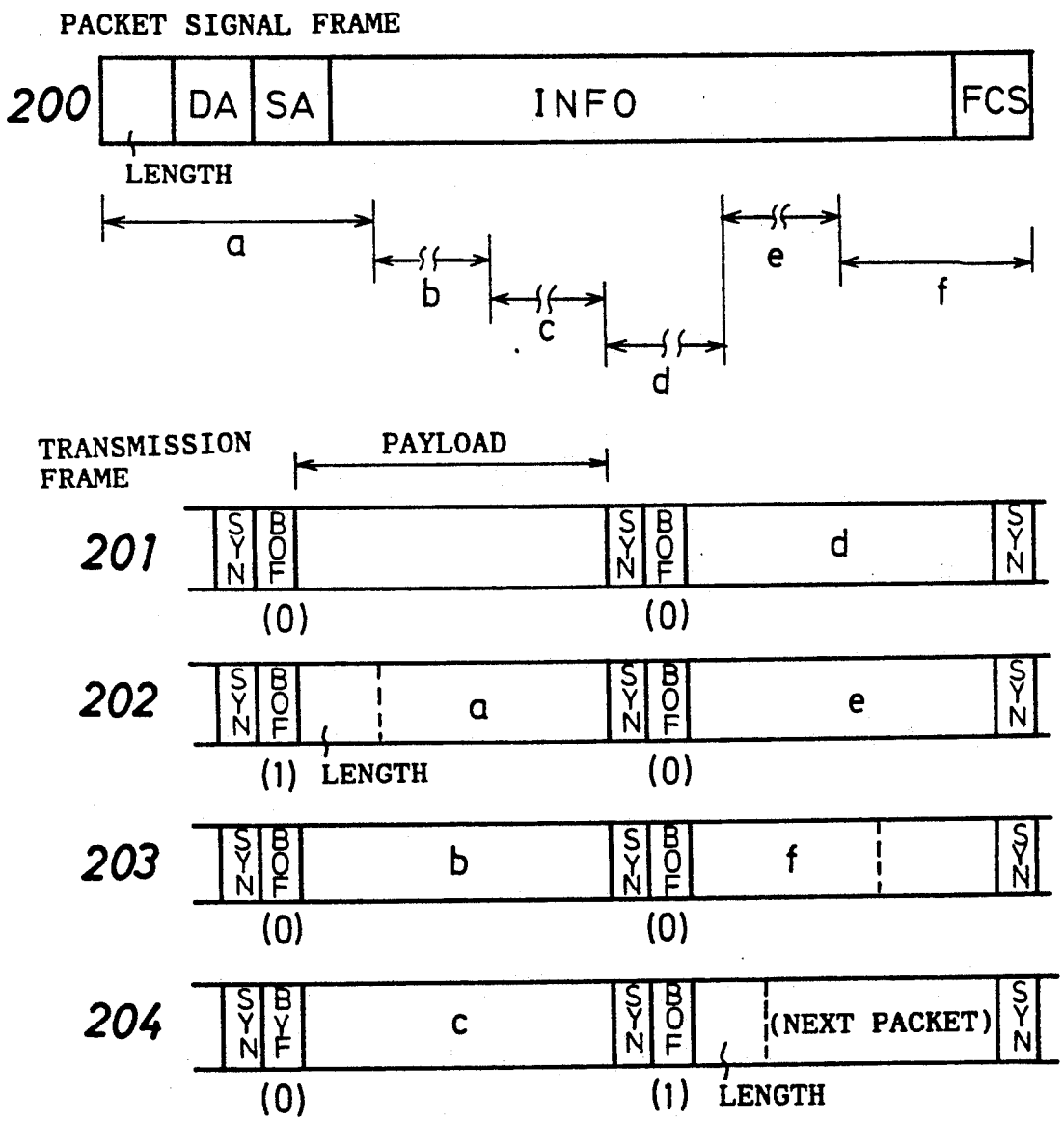

PARALLEL MULTI-LINE PACKET TRANSMISSION SYSTEM

BACKGROUND OF THE INVENTION

1. Field of the Invention

This invention relates to a packet transmission system for a local area network, and more particularly to a packet transmission system therein a telephone line or a twisted-pair cable which is economical and easy to handle is employed as a transmission medium.

2. Description of the Related Art

The local area network (LAN) has achieved a rapid development, and in recent years, much attention has been and is paid to a local area network which employs a telephone line or a twisted-pair cable which is easy to handle and inexpensive.

Several packet transmission systems are conventionally available. Representative ones of conventional packet transformation systems are the IEEE Std. 802.3 Type 10BASE-T (StarLAN 10, Twisted-Pair Ethernet) and the IEEE Std. 802.9 IVDLAN (Integrated Video, Voice and Data LAN) of the 802 Committee Standards of the Institute of Electrical and Electronic Engineering, Inc. (IEEE). According to the former system, the transmission rate is 10 Mbit/sec and the transmission range is about 100 m, and according to the latter system, the transmission rate is 4 Mbit/sec and the transmission range is about 450 m or so.

With such conventional packet transmission systems, however, since generally the transmission distance decreases as the transmission rate increases, in order to build up a LAN wherein, for example, the transmission rate is 16 Mbit/s and the transmission range is 400 m, an expensive coaxial cable must be employed. Accordingly, there is a problem that the cost for construction and maintenance of the system is high.

SUMMARY OF THE INVENTION

It is an object of the present invention to provide a packet transmission system wherein a packet can be transmitted at a high rate over a long transmission distance using a transmission medium which is economical and easy to handle.

In order to attain the object, according to the present invention, there is provided a packet transmission system, which comprises N time division transmission lines, N being an integral number equal to or greater than 2, and transmitter/receiver means for transmitting a packet signal by way of the time division transmission lines, the transmitter/receiver means including separating means for dividing a packet of the packet signal into M payloads for the packet transmission and outputting the M payloads as M transmission frames, M being an integral number equal to or greater than 2, transmitting means for coding the outputs of the separating means and transmitting them parallelly at a rate at which they can be transmitted by way of the time division transmission lines, receiving means for receiving the outputs of the transmitting means by way of the time division transmission lines and decoding the received outputs, and restoring means for assembling the outputs of the receiving means back into the original packet signal.

Preferably, the N time division transmission lines have successive sequence numbers applied thereto in advance, and the transmitting means includes means for sending out the M transmission frames into the N time division transmission lines in the order of the sequence numbers while the restoring means includes multiplexing means for assembling the M transmission frames received from the N time division transmission lines back into the original packet signal in accordance with the sequence numbers.

Preferably, the separating means includes means for adding a delimiter field for the transmission of delimiter information to a predetermined transmission frame, and the multiplexing means includes means for assembling the M transfer frames received from the N time division transmission lines back into the original packet signal in accordance with the sequence numbers and delimiter information of the delimiter field. The delimiter information may be a start delimiter and an end delimiter representative of a start and an end of the packet of the packet signal. Alternatively, the delimiter information may be information indicative of a length of the packet of the packet signal. In this instance, the separating means may include means for adding to each of the M transmission frames a signal representing whether or not transmission of the packet signal is started in the transmission frame. Each of the M transmission frames may include a plurality of subframes to which the delimiter information can be added.

Preferably, each of the M transmission frames includes a plurality of subframes each including a payload.

Preferably, the separating means includes means for adding a synchronizing signal to each of the M transmission frames.

In the packet transmission system, the separating means of the transmitter/receiver means divides a packet of a packet signal into M payloads for the packet transmission and outputs the M payloads as M transmission frames, M being an integral number equal to or greater than 2. The transmitting means codes the outputs of the separating means and transmits them parallelly at a rate at which they can be transmitted by way of the N time division transmission lines, N being an integral number equal to or greater than 2. The receiving means receives the outputs of the transmitting means by way of the N time division transmission lines and decodes the received outputs. The restoring means multiplexes the outputs of the receiving means back into the original packet signal.

With the packet transmission system, a packet can be transmitted at a high rate over a long transmission distance using a transmission medium which is economical and easy to handle.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a diagram illustrating operation of the packet transmission system of FIG. 1 when a start delimiter and an end delimiter are used for a transmission frame;

FIG. 3 is a similar view but illustrating operation of the packet transmission system of FIG. 1 when wherein packet length information is used for a transmission frame.

DETAILED DESCRIPTION OF THE PREFERRED EMBODIMENT

Figure 1:
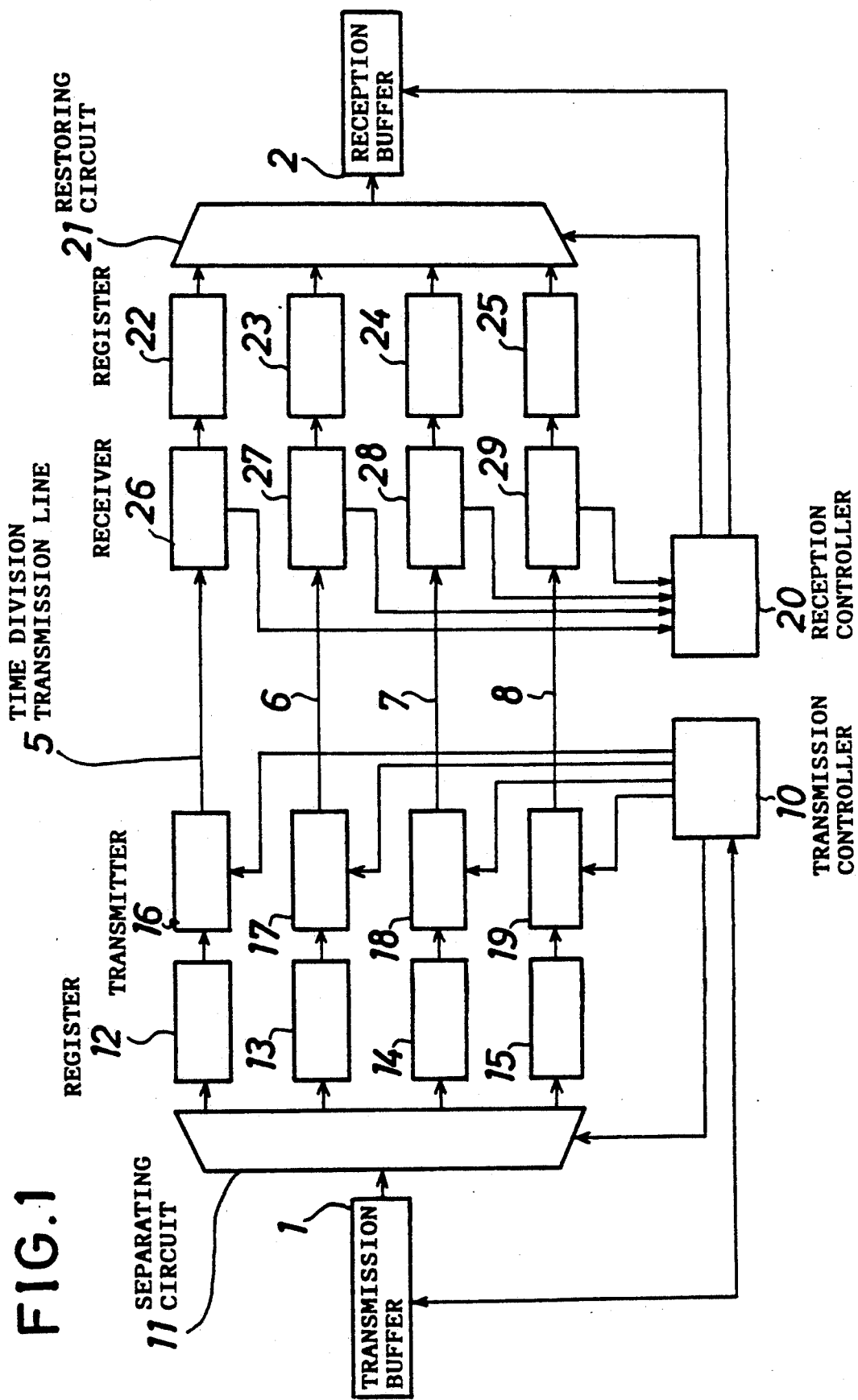
FIG. 1 is a block diagram of a packet transmission system showing a preferred embodiment of the present invention.

Referring to FIG. 1, there is shown a packet transmission system of a preferred embodiment of the present invention. The packet transmission system shown includes transmitter/receiver means for transmitting a packet signal by way of four time division transmission lines 5 to 8.

The transmitter/receiver means includes a transmission buffer 1, a separating circuit 11 connected to the transmission buffer 1, four registers 12 to 15 connected to the separating circuit 11, four transmitters 16 to 19 connected to the registers 12 to 15, respectively, a transmission controller 10 connected to the transmission buffer 1, separating circuit 11 and transmitters 16 to 19, four receivers 26 to 29 connected to the transmitters 16 to 19 by way of the time division transmission lines 5 to 8, respectively, four registers 22 to 25 connected to the receivers 26 to 29, respectively, a restoring circuit 21 connected to the registers 22 to 25, a reception buffer 2 connected to the restoring circuit 21, and a reception controller 20 connected to the receivers 26 to 29, restoring circuit 21 and reception buffer 2.

The transmission buffer 1, the separating circuit 11, the registers 12 to 15 and part of the transmission controller 10 serve as separating means for separating a packet of a packet signal into six payloads for the packet transfer and outputting them as six transmission frames; the transmitters 16 to 19 and part of the transmission controller 10 serve as transmitting means for coding the outputs of the registers 12 to 15 and transmitting them parallelly at a rate at which they can be transmitted by way of the time division transmission lines 5 to 8; the receivers 26 to 29 and part of the reception controller 20 serve as receiving means for receiving the outputs of the transmitters 16 to 19 by way of the time division transmission lines 5 to 8, respectively, and decoding them; and the registers 22 to 25, the restoring circuit 21, the reception buffer 2 and part of the reception controller 20 serve as restoring means for assembling the outputs of the receivers 26 to 29 back into an original packet signal.

Sequence numbers are applied in advance to the time division transmission lines 5 to 8, and the transmitters 16 to 19 include means for sending out transmission frames in the order of the sequence numbers into the time division transmission lines 5 to 8 under the control of the transmission controller 10. Meanwhile, the restoring circuit 21 includes means for assembling the six transmission frames received from the time division transmission lines 5 to 8 back into an original packet signal in accordance with the sequence numbers under the control of the reception controller 20.

Further, the separating circuit 11 includes means for adding a delimiter field for the transmission of delimiter information to a predetermined transmission frame under the control of the transmission controller 10. Meanwhile, the restoring circuit 21 includes means for assembling the six transfer frames received from the time division transmission lines 5 to 8 back into an original packet signal in accordance with the sequence numbers and the delimiter information of the delimiter field under the control of the reception controller 20.

The delimiter information may include a start delimiter and an end delimiter representative of a start and an end of a packet of a packet signal.

Operation of the packet transmission system of the construction when a start delimiter and an end delimiter are used for a transmission frame is described with reference to FIG. 2. A packet signal includes a destination address DA, a source address SA, information INFO and a frame check sequence FCS. A packet signal frame 100 is delimited by a start delimiter SD and an end delimiter ED. The packet signal in the transmission buffer 1 is divided by way of the separating circuit 11 under the control of the transmission controller 10 into six segments a to f, which are supplied to the registers 12 to 15 in this order. Thus, transmission frames 101 to 104 are supplied into the transmission lines 5 to 8. Synchronizing signals SYN are added to each of the transmission frames 101 to 104. The start delimiter SD is applied to the transmission frame 101 for carrying the first segment a of the packet signal by a transmission code violation (intentional violation of a transmission coding rule). The segments b to d are transmitted by way of the transmission lines 6 to 8, respectively, and the segments e and f are transmitted in the next frame cycle. The end delimiter ED is applied after the last segment f by the transmission coding violation. The transmission code violation can be provided peculiarly to the transmission code. When, for example, the AMI code is employed, while it is a coding rule of the AMI code that "+1" and "−1" are provided alternately to a binary digital signal each time "1" appears in the binary digital signal, the transmission code train of, for example, "0", "+1", "0", "+1", "0", "−1", "0" and "−1" is provided as the start delimiter SD, and the transmission code train of, for example, "0", "−1", "0", "−1", "0", "+1", "0" and "+1" is provided as the end delimiter ED. It is to be noted that they are a mere example and do not limit the scope of the present invention.

The transmission controller 10 performs the following control. When the transmission controller 10 detects arrival of a packet signal at the transmission buffer 1, it adds the word "01010101" corresponding to the start delimiter SD and the end delimiter ED to the packet signal. Then, it divides the packet signal with the length of a payload of a time division frame and writes the thus divided segments into the registers 12 to 15 by way of the separating circuit 11. The transmitters 16 to 19 code the binary digital signals of the segments stored in the registers 12 to 15, respectively, into transmission codes and send out the transmission codes to the transmission lines 5 to 8, respectively. The communication controller 10 effects control of the transmitters 16 to 19 so that such a coding violation as described above by way of the example may be provided to the words of the start delimiter SD and the end delimiter ED.

Subsequently, operation on the receiver side is described. Frame synchronization of the individual transmission lines 5 to 8 is maintained at the receivers 26 to 29, respectively, and detection of the start delimiter SD and the end delimiter ED is effected by monitoring a transmission code violation. The thus detected start delimiter SD and end delimiter ED are notified to the reception controller 20. Signals decoded into binary digital signals by the receivers 26 to 29 are written once into the registers 22 to 25, respectively, and then restored into the original packet signal by the restoring circuit 21. The thus restored original packet signal is subsequently stored into the reception buffer 2. In this instance, the reception controller 20 controls, in response to the detected start delimiter SD and end delimiter ED, the restoring circuit 21 in accordance with the order of the transmission lines 5 to 8 and writes the time division frame 100 of the packet signal shown in FIG. 2 into the reception buffer 2.

FIG. 3 illustrates operation of the packet transmission system shown in FIG. 1 when packet length information is employed for a transmission frame and a transmission coding violation is not used for the delimitation of a packet signal. The transmission controller 10 adds packet length information LENGTH to the top of a packet signal frame 200 in the transmission buffer 1. Transmission frames 201 to 204 are time division frames on the transmission lines 5 to 8, respectively. A bit of a signal BOF is defined and added subsequently to a synchronizing signal SYN. The signal BOF is a bit which indicates whether or not the following payload transmits a first portion of the segmented packet signal, and the value "1" of the signal BOF indicates that the following payload transmits the first segment of the packet signal which begins with packet length information LENGTH. The transmission controller 10 sets the signal BOF to "1" for a payload of a transmission line for transferring the first segment a, and in the case shown in FIG. 3, for the transmission frame 202 to be supplied into the time division transmission line 6. The signals BOF for the payloads which are to transfer the other segments b to f are all set to "0". In FIG. 3, the case is shown wherein parallel transmission is started beginning with the time division transmission line 6, and in the next frame period, the transmission of the packet signal is ended with the time division transmission line 7 and the next time division transmission line 8 starts transmission of a next packet signal.

On the receiver side, the signal BOF is decoded by the corresponding receiver 27, and it is notified to the reception controller 20 that the signal BOF is "1". The reception controller 20 thus detects starting of transmission of a packet signal and then reads out packet length information LENGTH in the packet signal. Segment information stored in the registers 22 to 25 is restored into the original packet signal by the restoring circuit 21 and stored into the reception buffer 2. An end of the packet signal is specified by the length information LENGTH read out as above. It is to be noted that packet length information LENGTH to be newly added need not be added to the head of a packet signal and may be added at a fixed position in a packet signal. Further, in case length information is provided in advance to a packet signal, there is no need of newly adding length information to the packet signal but the original length information may be used.

Figure 4A:
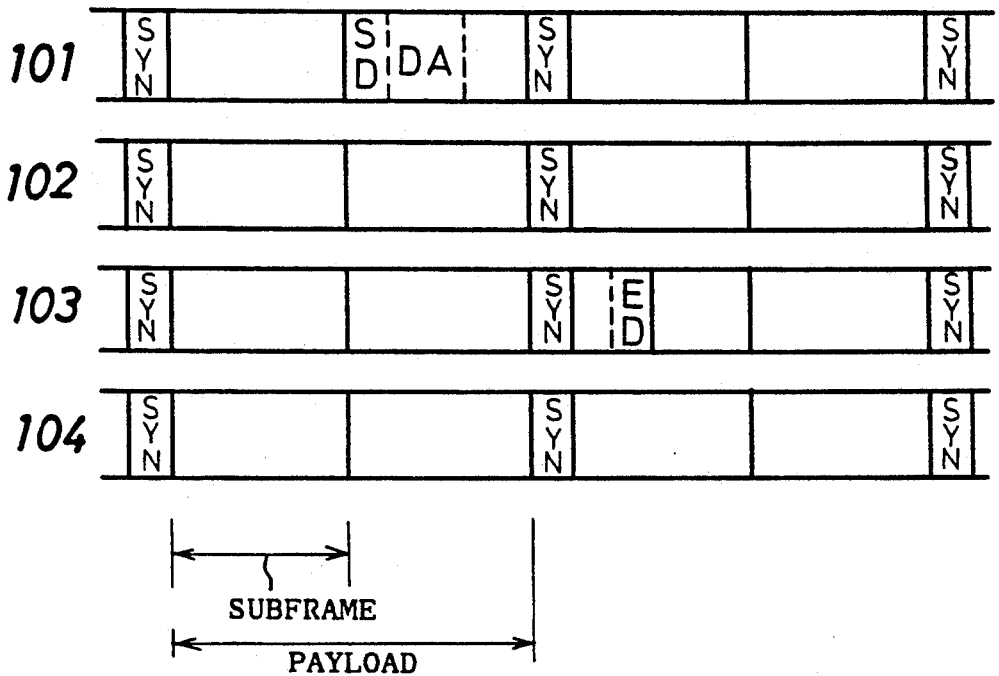
FIGS. 4(a) and 4(b) are diagrams illustrating different operations of the packet transmission system when two subframes are included in a transmission frame.
Figure 4B:
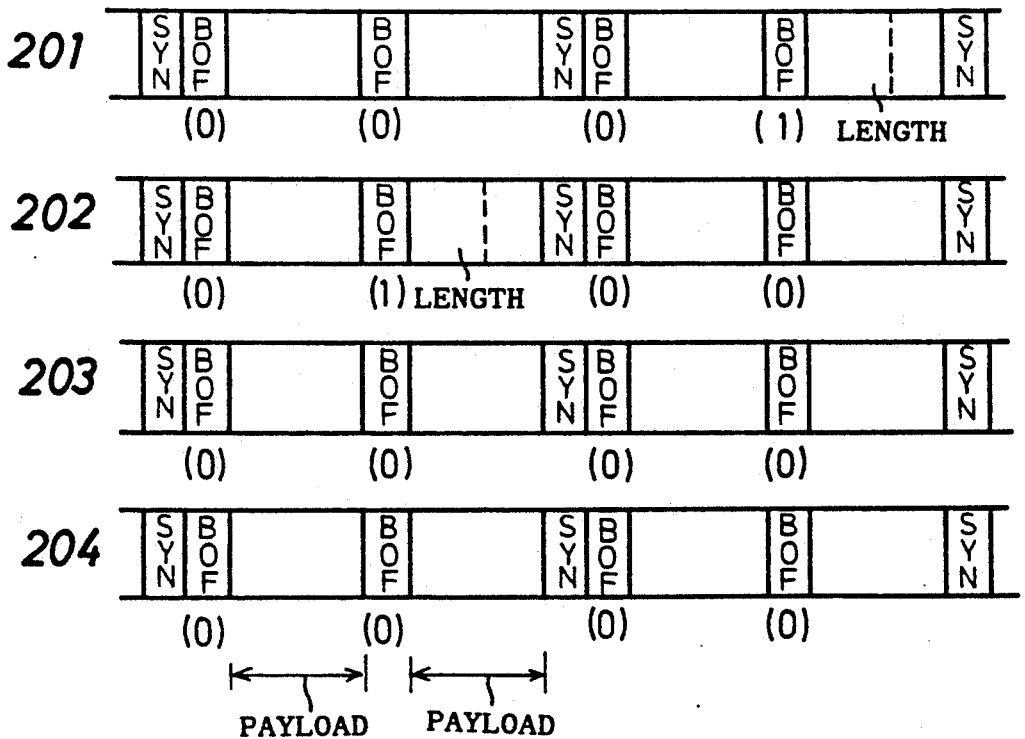

FIGS. 4(a) and 4(b) illustrate different operations of the packet transmission system when a transmission frame includes two subframes. FIG. 4(a) illustrates operation when a start delimiter and an end delimiter are employed, and FIG. 4(b) illustrate operation when packet length information is employed. While starting of transmission of a packet signal is allowed, in the operations illustrated in FIGS. 2 and 3, only once in a frame period defined by a synchronizing signal SYN, in the operations illustrated in FIGS. 4(a) and 4(b), a frame period is further divided into a plurality of subframes and consequently, sending out of a packet signal can be started in the unit of a subframe.

The present embodiment described above can thus realize a transmission system wherein, if the transmission rate of each transmission line for which a twisted-pair cable is employed is, for example, 4 Mbit/s, the total transmission capacity is 16 Mbit/s and the transmission distance is 450 m. Consequently, a transmission system can be provided which operates at a higher rate and has a longer transmission line than the conventional transmission system of 10 Mbit/s and 100 m.

Having now fully described the invention, it will be apparent to one of ordinary skill in the art that many changes and modifications can be made thereto without departing from the spirit and scope of the invention as set forth herein.

What is claimed is:

1. A parallel multi-line packet transmission system, comprising:

N time division transmission lines, N being an integral number equal to or greater than 2, which have successive sequence numbers applied thereto in advance; and transmitter/receiver means for transmitting a packet signal by way of said time division transmission lines, said transmitter/receiver means including:

separating means for dividing a packet of the packet signal into M payloads for the packet transmission and outputting the M payloads as M transmission frames, M being an integral number equal to or greater than 2;

transmitting means for adding packet length information to the original packet signal as a delimiter information, adding to each of said M transmission frames a signal representing whether or not transmission of said packet signal is started in the transmission frame, coding the outputs of said separating means, transmitting them parallelly at a predetermined rate by way of said time division transmission lines, and sending out M transmission frames into the N time division transmission lines in order of the sequence numbers;

receiving means for receiving the outputs of said transmitting means by way of said time division transmission lines and decoding the received outputs; and restoring means for assembling the M transmission frames received from said N time division transmission lines back into the original packet signal in accordance with the sequence numbers.

2. A parallel multi-line packet transmission system as claimed in claim 1, wherein said restoring means includes multiplexing means for assembling the M transmission frames received from said N time division transmission lines back into the original packet signal in accordance with the sequence numbers.

3. A parallel multi-line packet transmission system as claimed in claim 2, wherein said multiplexing means includes means for assembling the M transmission frames received from said N time division transmission lines back into the original packet signal in accordance with the sequence numbers and said delimiter information.

4. A parallel multi-line packet transmission system as claimed in claim 3, wherein the delimiter information is a start delimiter and an end delimiter representative of a start and an end of the packet of the packet signal.

5. A parallel multi-line packet transmission system as claimed in claim 3, wherein each of the M transmission frames includes a plurality of subframes to which the delimiter information can be added.

6. A parallel multi-line packet transmission system, comprising:

N time division transmission lines, N being an integral number equal to or greater than 2; which have successive sequence numbers applied thereto in advance; and transmitter/receiver means for transmitting a packet signal by way of said time division transmission lines, said transmitter/receiver means including:

separating means for dividing a packet of the packet signal into payloads for the packet transmission and outputting the payloads as M transmission frames, M being an integral number equal to or greater than 2;

transmitting means for coding the outputs of said separating means and transmitting them parallelly at a predetermined rate by way of said time division transmission lines;

receiving means for receiving the outputs of said transmitting means by way of said time division transmission lines and decoding the received outputs; and restoring means for assembling the output of said receiving means back into the original packet signal, wherein each of the M transmission frames includes a plurality of subframes each including a payload.

7. A parallel multi-line packet transmission system as claimed in claim 1, wherein said separating means includes means for adding a synchronizing signal to each of the M transmission frames.

8. A parallel multi-line packet transmission system as claimed in claim 7, wherein each of the M transmission frames includes a plurality of subframes to which the delimiter information can be added.

9. A parallel multi-line packet transmission system as claimed in claim 1, wherein each of the M transmission frames includes a plurality of subframes to which the delimiter information can be added.

* * * * *